United States Patent Office
2,924,615
Patented Feb. 9, 1960

2,924,615

AMINOALKYL ESTERS OF ARYL- AND ARALKYL-SUBSTITUTED PHOSPHINIC ACIDS AND THEIR SALTS

Clinton A. Dornfeld, Mundelein, Ill., assignor, by mesne assignments, to G. D. Searle & Co., Skokie, Ill., a corporation of Delaware No Drawing. Application January 13, 1954
Serial No. 403,903

14 Claims. (Cl. 260—461)

This invention relates to aminoalkyl and dialkylaminoalkyl esters of aryl- and aralkyl-substituted phosphinic acids, to acid addition and quaternary ammonium salts thereof, and to processes for the preparation of these acids and their salts. More particularly, this invention relates to compounds of the formula

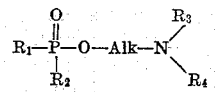

wherein $R_1$ is an aryl or aralkyl radical, $R_2$ is hydrogen or an aryl or aralkyl radical, Alk is an alkylene radical containing at least two and not more than five carbon atoms, and $R_3$ and $R_4$ are hydrogen or lower alkyl radicals containing not more than five carbon atoms.

In the foregoing structural formula, $R_1$ represents such aryl and aralkyl radicals as phenyl, halophenyl, tolyl, naphthyl, benzyl, benzhydryl, triphenylmethyl, and the like; and $R_2$ likewise represents such aryl and aralkyl radicals as these, plus also—alternatively—hydrogen. Alk symbolizes an alkylene radical, said alkylene radical being defined as a bivalent, saturated, acyclic, straight- or branched-chain hydrocarbon radical of empirical formula

wherein $n$ is a positive integer greater than one and less than six. The alkylene radicals comprehended by Alk as hereinabove defined include, for example:

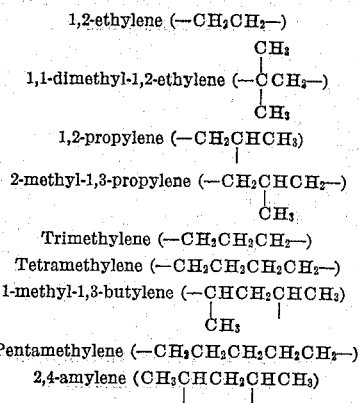

as well as such other alkylene radicals as fall within the purview of the aforesaid definition and terms. $R_3$ and $R_4$ each represent hydrogen or a lower alkyl radical containing less than six carbon atoms including in the latter category, for example, methyl, ethyl, n-propyl, isopropyl, sec.-butyl, tert.-butyl, sec. iso-amyl, and the like.

Equivalent to the compounds of the above formula for the purposes of this invention are (1) the acid addition salts formed by interaction of the subject compounds with one equivalent of any of various inorganic and strong organic acids, and (2) the quaternary ammonium salts prepared from compounds of the aforesaid formula by reaction thereof with a lower alkyl ester or halide. These acid addition and quaternary ammonium salts may be represented by the formula

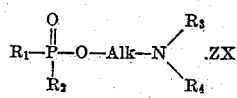

wherein $R_1$, $R_2$, $R_3$, $R_4$ and Alk have the meanings hereinbefore assigned, Z—like $R_3$ and $R_4$—is hydrogen or a lower alkyl group containing not more than five carbon atoms, and X is one equivalent of a non-toxic anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like.

The compounds of this invention are valuable in medicine as cardioregulatory agents. Thus, for example, their capacity for exercising a depressant effect on the heart muscle commends their use in the treatment of auricular fibrillation and flutter, paroxysmal, tachycardia, and divers other cardiac dysfunctions associated with rhythm changes of the heart caused by disturbances in the regular automaticity or conductance pattern of its beat. Additionally, the subject compounds are useful as diuretics. They have the property of augmenting both urine volume and sodium excretion, producing loss of body weight and decreased dyspnea in those cases of edema which frequently accompany congestive cardiac failure, renal disease, cirrhosis of the liver, and other common pathologic states. Still further, the compounds to which this invention relates, because of their ability to block the autonomic ganglia, are of value in the control of ulcer and other gastro-intestinal dysfunctions attributable to autonomic hyperactivity.

The basic esters which comprise this invention are relatively insoluble in water, but may be dissolved in dilute acids and in most of the common organic solvents. The acid addition and quaternary ammonium salts of this invention are, on the other hand, relatively soluble in water and in aqueous solutions of alcohols or other water-miscible organic solvents. The subject compounds may be administered in solid form as tablets or capsules; dissolved or suspended in aqueous media, they may be given parenterally.

The compounds of this invention are named in accordance with the recommendations of the Advisory Committee on Nomenclature of Organic Phosphorus Compounds organized by the Division of Organic Chemistry of the American Chemical Society as reported in Chemical and Engneerng News, 30, 4515 (1952).

The basic esters to which this invention relates are derived from the appropriate phosphinic acids. These acids, with the exception of triphenylmethylphosphinic acids, are prepared in accordance with the procedures of Kosolapoff and Huber, J. Am. Chem. Soc., 69, 2020 (1947), and Kosolapoff, ibid, 70, 3465 (1948), which in turn are modifications of the Michaelis reaction, Ber. 12, 1009 (1879). Triphenylmethylphosphinic acid is prepared as described by Hatt, J. Chem. Soc., 1933, 776. The phosphinic acid of choice is first converted to a salt, for example, by heating with an alkali amide or an alkali alkoxide such as sodium methoxide to temperatures of the order of 50–200° centigrade in the presence of an inert solvent such as xylene, cumene, cymene, decalin, ethylbenzene, toluene, or the like. An inert, anhydrous atmosphere such as a dry nitrogen atmosphere is desirable for protection against moisture during this and the succeeding step of the subject procedure. An appropriate aminoalkyl halide or dialkylaminoalkyl halide is next introduced into the reaction mixture, following which, and after heating for—preferably—1–5 hours at temperatures in the 50–200° centigrade range, the tertiary amino esters of this invention are obtained as reaction products. Conversion of the tertiary compounds to the corresponding acid addition salts is accomplished by simple admixture of the said compounds with one equivalent of any of various inorganic and strong organic acids, the anionic portion of which conforms to the definition of X as set forth hereinabove. Alternatively, the subject tertiary amino esters may be quaternized by addition of an alkyl ester of the formula $$Z—X$$

Z and X having the meanings hereinbefore assigned. Quaternization takes place in the temperature range of 25–100° centigrade, using inert solvents such as chloroform, acetone, methyl ethyl ketone, methanol, butanol, and the like as reaction media. The quaternization is ordinarily completed in from 12 to 48 hours, and is generally carried out in a closed system if a lower alkyl halide—such as methyl chloride—is one of the reagents. Using methyl chloride, the reaction may be smoothly effected in chloroform solution at 80° centigrade, the reaction time being 24 hours.

The following examples will illustrate in detail certain of the compounds which constitute the present invention and methods which have been devised for their preparation. However, the invention is not to be construed as limited thereby either in spirit or in scope since it will be apparent to those skilled in the art of organic synthesis that many modifications, both of materials and of methods may be practiced without departing from the purpose and intent of this disclosure. In the examples hereinafter detailed, temperatures are given in degrees centigrade (°C.), pressures in millimeters (mm.) of mercury and relative amounts of materials in parts by weight, except as otherwise noted.

*Example 1*

β-Diethylaminoethyl triphenylmethylphosphinate hydrochloride.—To 31 parts of triphenylmethylphosphinic acid in 435 parts of xylene at 100° C. is added, portionwise, 6 parts of sodium methoxide. The mixture is agitated and heated for 1½ hours at 120° C., at which point a solution of 15 parts of β-diethylaminoethyl chloride in 250 parts of xylene is slowly added over a one-hour period, temperature of the reactants being maintained as before. Following this addition, heating is continued at 120° C. with agitation for 5 hours. A white precipitate which forms in process is filtered off and the filtrate thereupon extracted several times with dilute aqueous sodium carbonate solution. (From these carbonate extracts, upon acidification, unchanged triphenylmethylphosphinic acid is recovered.) The xylene solution is next washed twice with water, then stripped of solvent in vacuo. The residue is taken up in approximately 70 parts of anhydrous ether. After cooling to 0–50° C., a small amount of insoluble material is filtered out. The filtrate is treated with 9 parts of a 25% absolute isopropyl alcohol solution of hydrogen chloride. The mixture is cooled and the supernatant ether thereupon decanted from the gummy precipitate formed. The precipitate is extracted with methyl ethyl ketone, then dried overnight at approximately 80° C. The product thus obtained, pure β-diethylaminoethyl triphenylmethylphosphinate hydrochloride, shows M.P. 139–140° C. It has the formula

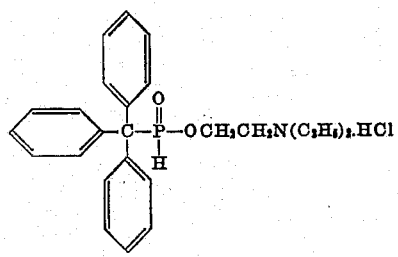

*Example 2*

(A) β - Diisopropylaminoethyl triphenylmethylphosphinate.—A mixture of 31 parts of triphenylmethylphosphinic acid, 6 parts of sodium methoxide, and 435 parts of xylene is heated with agitation to 100° C. in an atmosphere of nitrogen. Methyl alcohol formed in process is removed by distillation. A solution of 22 parts of β-diisopropylaminoethyl chloride hydrochloride in a small amount of water is made alkaline with a large excess of solid potassium carbonate. The chloride base which thus precipitates is taken up in xylene by repeated extraction with 85-part quantities of this solvent. The two xylene extracts are combined, dried over anhydrous potassium carbonate, and filtered, in that order. The carbonate is washed on the filter with an additional 45-part quantity of xylene, whereupon the combined (wash plus extracts) filtrate is slowly added, with agitation, at 90–100° C. to the reaction mixture above. Heating at 90–100° C. is continued for 2 hours, a nitrogen atmosphere being maintained throughout. The reaction mixture is then filtered, and subsequenty washed with dilute aqueous potassium carbonate solution. (Acidification of the carbonate wash returns a small amount of starting acid.) The xylene solution is next dried over anhydrous potassium carbonate, after which solvent is evaporated off in vacuo at not greater than 80° C. The oily residue is taken up in approximately 80 parts of anhydrous ether. Upon standing, crystals of the desired β-diisopropylaminoethyl triphenylmethylphosphinate separate. Recovered on a filter and finally dried in vacuo overnight, the product shows M.P. 86–87° C.

(B) β - Diisopropylaminoethyl triphenylmethylphosphinate methobromide.—A solution of 10 parts of the base of the foregoing part A and 3 parts of methyl bromide in 75 parts of chloroform is maintained at 80° C. in a sealed vessel for 72 hours. Solvent is then evaporated and the residue allowed to stand, becoming crystalline. The product, β-diisopropylaminoethyl triphenylmethylphosphinate methobromide, has the formula

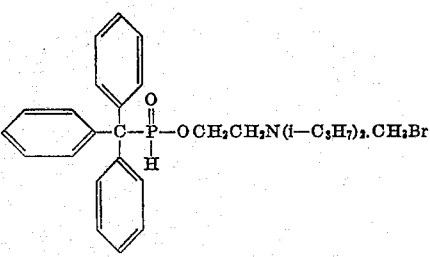

*Example 3*

γ-Diethylaminopropyl triphenylmethylphosphinate.—A mixture of 31 parts of triphenylmethylphosphinic acid, 6 parts of sodium methoxide, and 435 parts of xylene is heated to 120° C. in a nitrogen atmosphere over a period of one hour. A small amount of liquid (methyl alcohol) distills from the reaction mixture during this time and is discarded. Conversion of 19 parts of γ-diethylaminopropyl chloride hydrochloride to the corresponding base is effected by dissolution of the acid salt in a small amount of water and subsequent alkalinization with cold aqueous potassium carbonate solution. The base is extracted into xylene according to the technique of Example 2A, and the dried xylene solution is very slowly added to the reaction mixture above at 120° C. Following the addition, heating is continued at 120° C. for approximately 3 hours. The mixture is then filtered, and solvent is stripped from the filtrate in vacuo. The residue, γ-diethylaminopropyl triphenylmethylphosphinate, has the formula

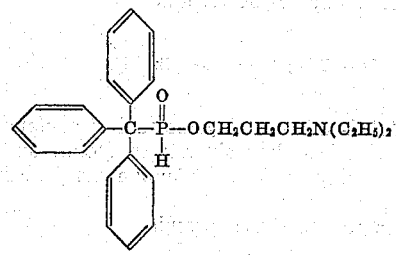

Example 4

(A) *β-Diethylaminoethyl diphenylphosphinate hydrochloride.*—A mixture of 109 parts of diphenylphosphinic acid and 27 parts of sodium methoxide in approximately 870 parts of xylene is heated at reflux temperatures for between 30 minutes and 1 hour. To the mixture at these temperatures is then slowly added 68 parts of β-diethylaminoethyl chloride dissolved in 175 parts of xylene over an 80-minute period. The reagents are maintained at reflux temperatures with agitation for 3 hours and then allowed to stand overnight at room temperatures. The reaction mixture is filtered, following which the filtrate is washed several times with aqueous sodium carbonate solution, then finally with water. The material is next dried over anhydrous potassium carbonate. Approximately 37 parts of a 25% absolute isopropyl alcohol solution of hydrogen chloride is added with agitation. A white precipitate forms on chilling and standing. The product thus obtained, β-diethylaminoethyl diphenylphosphinate hydrochloride, is filtered off and dried in vacuo overnight at temperatures in the neighborhood of 75° C.

(B) *β-Diethylaminoethyl diphenylphosphinate methobromide.*—A turbid solution of 19 parts of the acid addition salt of the foregoing part A in a small amount of water is treated with decolorizing charcoal and filtered. The clear filtrate is made alkaline with an excess of aqueous sodium carbonate solution. The basic ester thus precipitated is extracted into ether; and this ether solution is then dried over anhydrous potassium carbonate, filtered, and finally stripped of solvent. The residue is taken up in approximately 75 parts of chloroform and 5 parts of methyl bromide is then added. The reagents are maintained in a sealed vessel at approximately 80° C. overnight. After cooling, a small amount of anhydrous ether is added; and the precipitate which has formed is filtered off and subsequently dried in vacuo. The β-diethylaminoethyl diphenylphosphinate methobromide thus obtained is extracted with hot dioxane, in which the material is substantially insoluble. Next, the product is crystallized from isopropyl alcohol, a small amount of insoluble material being filtered off in process. The pure crystalline material thus obtained has the formula

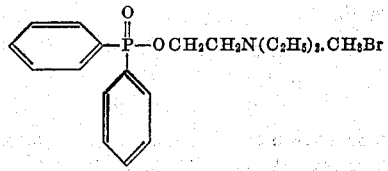

Example 5

(A) *β-Diisopropylaminoethyl diphenylphosphinate hydrochloride.*—A mixture of 55 parts of diphenylphosphinic acid, 14 parts of sodium methoxide, and 435 parts of xylene is heated to reflux temperatures. The mixture becomes quite viscous, and an additional 175 parts of xylene is therefore added as a diluent. After half an hour, a solution (in approximately 175 parts of xylene) of the chloride base obtained from 60 parts of β-diisopropylaminoethyl chloride hydrochloride according to the technique of Example 2A is added, portion-wise, following which the reagents are maintained at reflux temperatures for about 4 hours. The reaction mixture is filtered hot, and the precipitate thus removed is washed on the filter with a small amount of xylene. Filtrate and washings are combined, washed several times with aqueous sodium carbonate solution, and finally with water. (Acidification of the carbonate washings returns some unchanged diphenylphosphinic acid starting material.) The xylene solution is next dried over anhydrous potassium carbonate, after which one equivalent of an absolute isopropyl alcohol solution of hydrogen chloride is added. The hydrochloride formed comes down as an oil. The xylene layer is decanted, and the oil is then stirred with successive portions of anhydrous ether until it crystallizes. The crystalline product is filtered off and dried in a steam cabinet overnight. Recrystallized from approximately 80 parts of methyl ethyl ketone, the product shows M.P. approximately 130° C. The material is β-diisopropylaminoethyl diphenylphosphinate hydrochloride.

(B) *β - Diisopropylaminoethyl diphenylphosphinate methobromide.*—A solution of 21 parts of the hydrochloride of the foregoing part A in 100 parts of water is treated with decolorizing charcoal, filtered, and made alkaline with an excess of aqueous potassium carbonate solution. The basic ester which precipitates is extracted into approximately 100 parts of chloroform. The chloroform solution is dried over anhydrous potassium carbonate, then filtered into a sealed vessel. The filter is washed with approximately 35 parts of fresh chloroform, the washings being combined with the filtered extract. Approximately 9 parts of methyl bromide is then introduced into the sealed vessel, which is heated at 80° C. overnight. The crystalline precipitate which forms is β-diisopropylaminoethyl diphenylphosphinate methobromide. It shows M.P. approximately 134° C. and has the formula

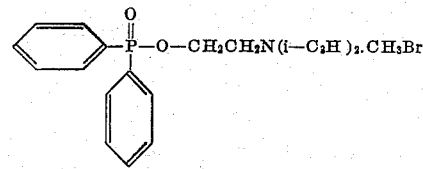

Example 6

(A) *β-Diethylaminoethyl p,p'-dichlorodiphenylphosphinate.*—A mixture of 46 parts of p,p'-dichlorodiphenylphosphinic acid, 9 parts of sodium methoxide, and 435 parts of xylene is heated at reflux temperatures for 30 minutes, following which 25 parts of β-diethylaminoethyl chloride is added and reflux then continued for 3 hours. The reaction mixture is filtered to remove insoluble by-product and the filtrate then extracted with dilute muriatic acid. This extract is made alkaline with cold aqueous caustic, precipitating the ester base, which in turn is extracted into ether. The ether solution, first washed several times with water and then dried over anhydrous potassium carbonate, is stripped of solvent to give the desired β-diethylaminoethyl p,p'-dichlorodiphenylphosphinate as a residue.

(B) *β - Diethylaminoethyl p,p'-dichlorodiphenylphosphinate citrate.*—Approximately 10 parts of anhydrous citric acid is dissolved in the minimal amount of hot isopropyl alcohol. The solution is cooled and diluted with anhydrous ether. This solution is added with agitation to a solution in 175 parts of anhydrous ether of the ester base obtained in the preceding part A. A gummy precipitate forms which, upon decantation of the ether supernatant and subsequent standing overnight, crystallizes. The product, after two crystallizations from methyl ethyl ketone, using decolorizing charcoal in process, shows M.P. about 101° C. The β-diethylaminoethyl p,p'-dichlorodiphenylphosphinate thus obtained has the formula

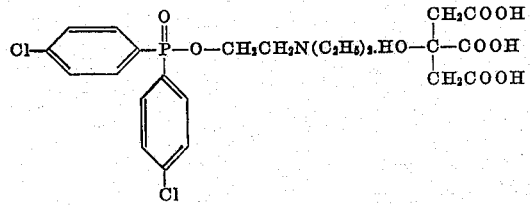

Example 7

*Tri-β-diethylaminoethyl phosphate trihydrochloride.*—A solution of 176 parts of β-diethylaminoethyl alcohol in 750 parts of chloroform is cooled to 0° C. and 77 parts of phosphorus oxychloride is very slowly added thereto over a one-hour period. Reaction temperature is maintained at or below 10° C. during the most of this time, rising to 32° C. near the end of the addition. A precipitate forms on the walls of the reaction vessel. The precipitate is washed down with an additional 750 parts of chloroform, following which the reactants are heated for several hours at reflux temperatures. The precipitate is filtered off, washed with a little chloroform, and dried in vacuo at around 70° C. The product is recrystallized from approximately 275 parts of alcohol. Addition of anhydrous ether to the mother liquor affords a second crop of crystalline product. The tri-β-diethylaminoethyl phosphate trihydrochloride thus obtained has the formula

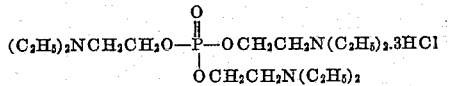

Example 8

*Di-β-diethylaminoethyl ethyl phosphate dihydrochloride.*—To a solution of 12 parts of β-diethylaminoethyl alcohol in 225 parts of chloroform is added 17 parts of diethyl phosphorochloridate. The reagents are heated at reflux temperatures for approximately 72 hours. The di-β-diethylaminoethyl ethyl phosphate dihydrochloride formed in process as a white precipitate is filtered off, washed on the filter with a little chloroform, and finally dried in vacuo in the steam cabinet. The product has the formula

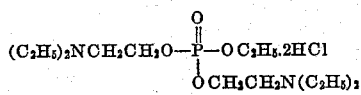

Example 9

(A) *Di-n-butyl β-diethylaminoethyl phosphoramidate.*—A mixture of 23 parts of di-n-butyl phosphorochloridate, 12 parts of N,N-diethylethylenediamine, and 150 parts of chloroform is heated in a sealed vessel at approximately 80° C. for 48 hours. A red color develops. Approximately 11 parts of di-n-propylamine is stirred into the residue, followed by a quantity of anhydrous ether. Hydrogen chloride is tied up in the form of di-n-propylamine hydrochloride which precipitates as a white solid. This precipitate is filtered out and discarded. Solvent is stripped from the filtrate in vacuo, and the residue is then distilled—also in vacuo—to give pure di-n-butyl β-diethylaminoethyl phosphoramidate, B.P. 150° C. at 0.1 mm. pressure, as a colorless product, liquid at room temperatures.

(B) *Di-n-butyl β-diethylaminoethyl phosphoramidate citrate.*—A mixture of 20 parts of the basic amido ester of the preceding part A, 13 parts of anhydrous citric acid and approximately 40 parts of methyl ethyl ketone is brought into solution by warming. Upon chilling, the desired di-n-butyl β-diethylaminoethyl phosphoramidate citrate crystallizes out. The product, recrystallized from about 120 parts of methyl ethyl ketone, shows M.P. 72–73° C. It has the formula

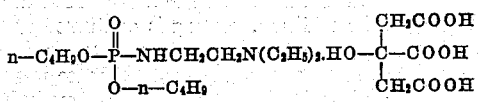

I claim:

1. A compound of the formula

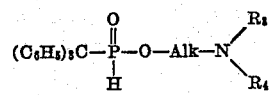

wherein Alk is a lower alkylene radical containing more than one and less than six carbon atoms, and $R_3$ and $R_4$ are lower alkyl radicals containing less than six carbon atoms.

2. A compound of the formula

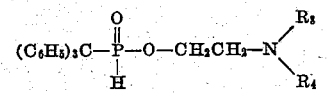

wherein $R_3$ and $R_4$ are lower alkyl radicals containing less than six carbon atoms.

3. β-Diisopropylaminoethyl triphenylmethylphosphinate.

4. β-Diethylaminoethyl triphenylmethylphosphinate hydrochloride.

5. A compound of the formula

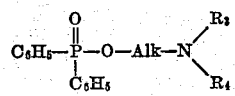

wherein Alk is a lower alkylene radical containing more than one and less than six carbon atoms, and $R_3$ and $R_4$ are lower alkyl radicals containing less than six carbon atoms.

6. A compound of the formula

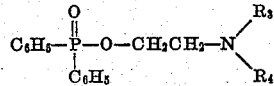

wherein $R_3$ and $R_4$ are lower alkyl radicals containing less than six carbon atoms.

7. β-Diethylaminoethyl diphenylphosphinate.

8. β-Diisopropylaminoethyl diphenylphosphinate hydrochloride.

9. β-Diisopropylaminoethyl diphenylphosphinate methobromide.

10. A compound of the formula

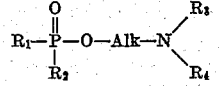

and non-toxic salts thereof, $R_1$ in the said formula being selected from the group consisting of phenyl, chlorophenyl, and triphenylmethyl radicals; $R_2$ being selected from the group consisting of hydrogen and phenyl and chlorophenyl radicals; Alk being a lower alkylene group containing more than one and less than six carbon atoms; and $R_3$ and $R_4$ being lower alkyl radicals containing less than six carbon atoms.

11. In a process for the manufacture of compounds of the formula

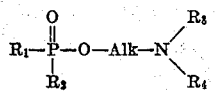

and non-toxic salts thereof, $R_1$ in the foregoing formula being selected from the group consisting of phenyl, chlorophenyl, and triphenylmethyl radicals; $R_2$ being selected from the group consisting of hydrogen and phenyl and chlorophenyl radicals; Alk being a lower alkylene group containing more than one and les than six carbon atoms; and $R_3$ and $R_4$ being lower alkyl radicals containing less than six carbon atoms, the steps which comprise reacting a substituted phosphinic acid of the formula

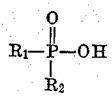

wherein $R_1$ and $R_2$ have the meanings hereinbefore assigned, with a salt-forming agent selected from the group consisting of an alkali amide and an alkali alkoxide, at temperatures between 50° and 200° centigrade in the presence of an inert solvent, and reacting this mixture with an aminoalkyl halide of the formula

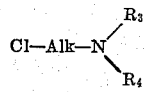

wherein Alk, $R_3$, and $R_4$ have the meanings hereinbefore assigned, at temperatures in the range of 50–200° centigrade for periods of time between one and five hours.

12. In a process for the manufacture of compounds of the formula

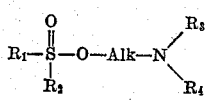

and non-toxic salts thereof, $R_1$ in the said formula being selected from the group consisting of phenyl, chlorophenyl, and triphenylmethyl radicals; $R_2$ being selected from the group consisting of hydrogen and phenyl and chlorophenyl radicals; Alk being a lower alkylene group containing more than one and less than six carbon atoms; and $R_3$ and $R_4$ being lower alkyl radicals containing less than six carbon atoms, the steps which comprise reacting a substituted phosphinic acid of the formula

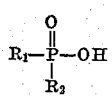

wherein $R_1$ and $R_2$ have the meanings hereinbefore assigned, with an alkali alkoxide at temperatures between 50° and 200° centigrade in the presence of an inert solvent, and reacting this mixture with an aminoalkyl halide of the formula

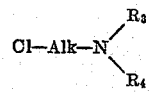

wherein Alk, $R_3$, and $R_4$ have the meanings hereinbefore assigned, at temperatures in the range of 50–200° centigrade for periods of time between one and five hours.

13. In a process for the manufacture of compounds of the formula

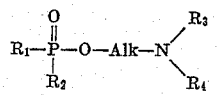

and non-toxic salts thereof, $R_1$ in the said formula being selected from the group consisting of phenyl, chlorophenyl, and triphenylmethyl radicals; $R_2$ being selected from the group consisting of hydrogen and phenyl and chlorophenyl radicals; Alk being a lower alkylene group containing more than one and less than six carbon atoms; and $R_3$ and $R_4$ being lower alkyl radicals containing less than six carbon atoms, the steps which comprise reacting a substituted phosphinic acid of the formula

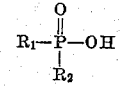

wherein $R_1$ and $R_2$ have the meanings hereinbefore assigned, with sodium methoxide at temperatures between 100° and 130° centigrade, using xylene as a solvent, and reacting this mixture with an aminoalkyl halide of the formula

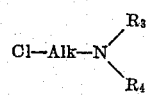

wherein Alk, $R_3$, and $R_4$ have the meanings hereinbefore assigned, at temperatures in the range of 100–130° centigrade for periods of time between one and five hours.

14. A compound selected from the group consisting of a compound of the formula:

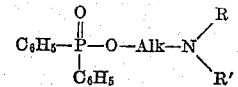

wherein Alk is lower alkylene, and R and R' are lower alkyl radicals, and the hydrochloride and methiodide salts thereof.

References Cited in the file of this patent

UNITED STATES PATENTS

| | | |
|---|---|---|
| 2,328,570 | McNally et al. | Sept. 7, 1943 |
| 2,494,283 | Cassaday et al. | Jan. 10, 1950 |
| 2,570,503 | Tawney | Oct. 9, 1951 |
| 2,612,514 | Plueddemann | Sept. 30, 1952 |

FOREIGN PATENTS

| | | |
|---|---|---|
| 684,977 | Great Britain | Dec. 31, 1952 |

OTHER REFERENCES

Bost et al.: J. Am. Chem. Soc., 73, 24 (1951).
Bost et al.: J. Org. Chem., 18, 362–6 (1953).

UNITED STATES PATENT OFFICE
CERTIFICATE OF CORRECTION

Patent No. 2,924,615                          February 9, 1960

Clinton A. Dornfeld

It is hereby certified that error appears in the printed specification of the above numbered patent requiring correction and that the said Letters Patent should read as corrected below.

Column 6, line 47, for that portion of the formula reading "(i-C3H)" read -- (i-C$_3$H$_7$) --; column 9, line 1, for "les" read -- less --; lines 25 to 29, claim 12, the formula should appear as shown below instead of as in the patent:

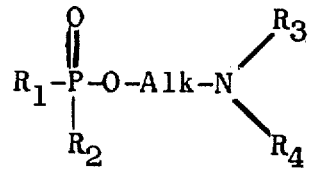

Signed and sealed this 9th day of August 1960.

(SEAL)
Attest:

KARL H. AXLINE                          ROBERT C. WATSON
Attesting Officer                    Commissioner of Patents